United States Patent [19]
Auberry et al.

[11] 3,965,517
[45] June 29, 1976

[54] METHOD AND DEVICE FOR THE MANUFACTURE OF FOOTWEAR

[75] Inventors: Horace Ray Auberry; Anton Liebscher, both of Waynesville, N.C.

[73] Assignee: Ro-Search, Inc., Waynesville, N.C.

[22] Filed: Oct. 18, 1974

[21] Appl. No.: 515,901

Related U.S. Application Data

[63] Continuation-in-part of Ser. No. 410,393, Oct. 29, 1973, abandoned.

[52] U.S. Cl. ............................................ 12/142 RS
[51] Int. Cl.² ........................................... A43D 9/00
[58] Field of Search ............ 12/142 R, 142 RS, 1 A, 12/1 R, 36, 37

[56] References Cited
UNITED STATES PATENTS

| 1,236,636 | 8/1917 | Wentworth | 12/37 |
| 1,723,522 | 8/1929 | Pochin et al. | 12/37 |
| 2,956,313 | 10/1960 | Choice | 12/142 RS |
| 3,577,503 | 5/1971 | Innocenti | 12/142 RS |
| 3,758,903 | 9/1973 | Auberry et al. | 12/142 RS |

*Primary Examiner*—Patrick D. Lawson
*Attorney, Agent, or Firm*—Dos T. Hatfield

[57] ABSTRACT

The invention discloses a method and device for the attaching of soles to uppers of footwear which assures the correct seating of the upper on the last prior to the attaching of the sole and allows further to shorten the time needed to bond the sole to the upper.

9 Claims, 3 Drawing Figures

U.S. Patent   June 29, 1976   Sheet 1 of 2   3,965,517
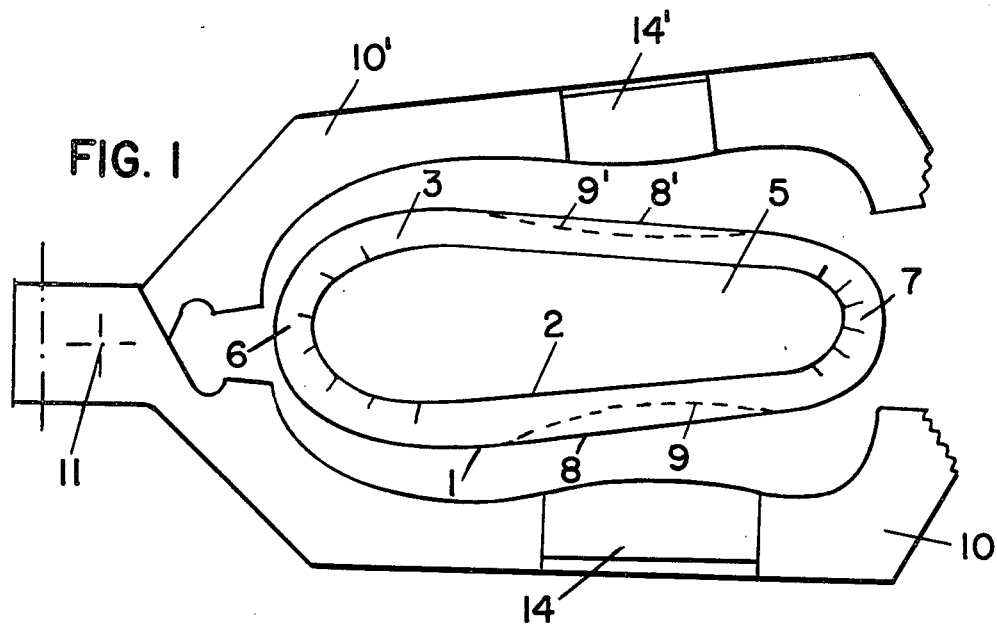
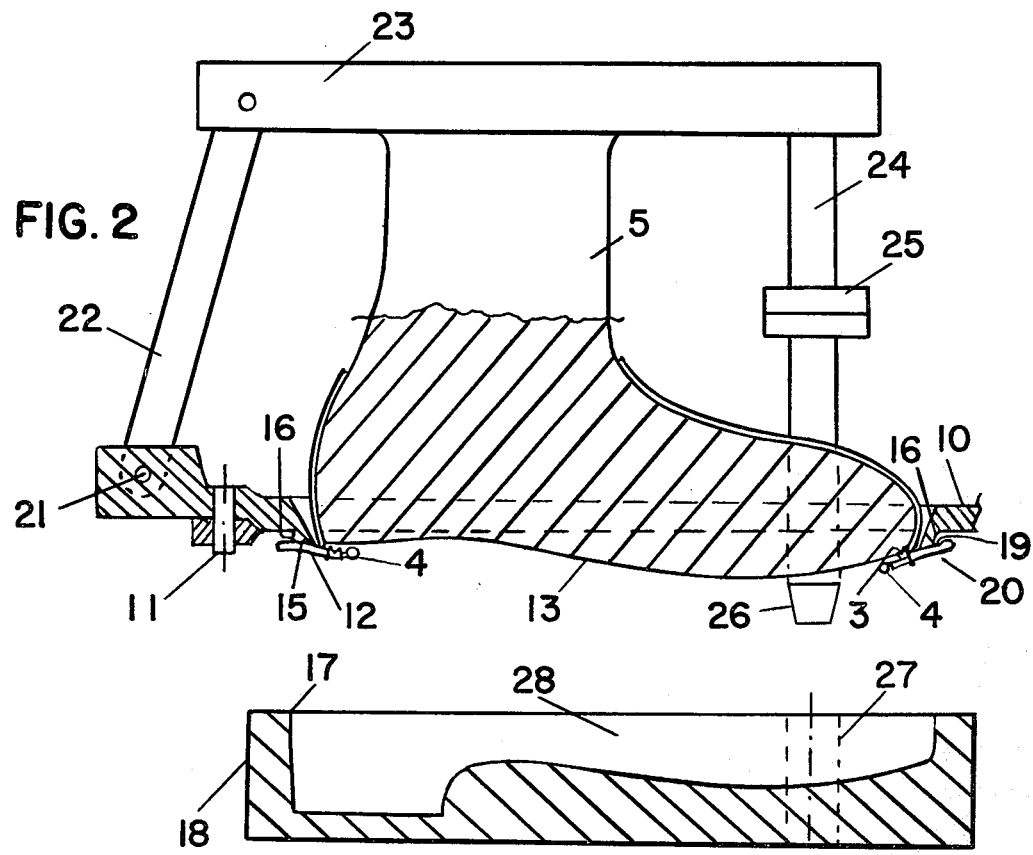

METHOD AND DEVICE FOR THE MANUFACTURE OF FOOTWEAR

This application is a continuation-in-part of our application Ser. No. 410,393, filed Oct. 29, 1973, now abandoned.

BACKGROUND OF THE INVENTION

In our application Ser. No. 277,884, now U.S. Pat. No. 3,758,903, which was a continuation-in-part of our application Ser. No. 78,412, now abandoned, we disclose a method and device for the manufacture of footwear wherein in a loading station of a sole attaching device, the upper is placed on a last, secured in its position thereafter by a side frame forming part of the sole mold cavity, whereupon after locking the side frame against the last, the unit is moved to a molding station to close a sole cavity, where preferably by injection molding, a sole is formed and bonded to the bottom margin of the upper. The sealing of the sole cavity against the upper is obtained by a lip of the side frame which has to be relatively heavy to withstand the pressure of the sole material.

It is known in the manufacture of stitch-down shoes to use a lip plate separated from the sole cavity member provided with a blanking knife edge. The lip plate serves as an anvil plate and is, therefore, subjected to heavy pressure which is required to cut through both the upper material and the stitch-down midsole.

SUMMARY

According to the invention, a prewelted upper is lasted without structural insole or midsole on the last of a sole molding device having a divided lip plate, using the lip plate to locate and position the welt in the desired final position while the shoe bottom is freely accessible also for visual inspection and before the unit of last, upper, lip plate and lip plate positioning means are brought into juxtaposition with the sole molding cavity parts comprising a side wall and a bottom wall member. In this position of closed cavity, the welt is clamped between the lip plate and the rim of the molding cavity to assure both a reliable sealing of the molding cavity and also a spacing, an air gap, between the lip plate and the cavity rim. This spacing prevents essential heat transfer from the cavity member to the lip plate. Even if the cavity member, such as the side frame, is maintained at high heat for speedy vulcanization of the sole elastomer (rubber), the lip plate remains at a much lower temperature, thus enabling easy handling of the lip plate during loading, lasting and unloading of the mold last.

In the use of sole attaching devices in which the upper, mounted on a last, is moved from a loading to a sole attaching station, the invention provides for the use of a light lip plate not only to facilitate the handling in placing and locking the lip plate against the upper, but also the use of the lip plate so that heavy pressure against the lip plate is avoided. This prevents distortions of the lip plate and the danger of damage to the upper and/or faulty sealing. At the same time, it is possible to refrigerate the sole cavity member, comprising both side and bottom walls, before moving the cavity member to the molding position of an injection molding sole attaching device.

BRIEF DESCRIPTION OF THE DRAWING

FIG. 1 is a schematic top view of an upper on a last prior to the closing of the lip plate;

FIG. 2 is a side view, partly in section, of the upper on the last with the lip plate in closed position above the sole cavity member.

DESCRIPTION OF THE PREFERRED EMBODIMENT

Figure 3:
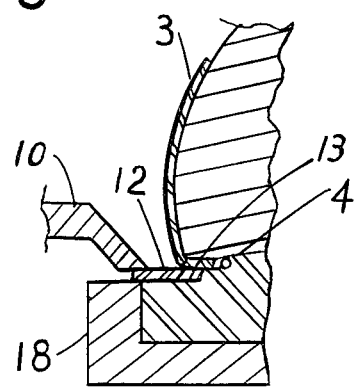
FIG. 3 is a side view, partly in section, of the upper on the last with the lip plate in closed position in the cavity member.

As shown in FIGS. 1 and 2, the upper 1, provided at the inner edge 2 of its lasting margin 3 with a lasting string 4, is lasted in the known manner on the last 5. The tightening of the lasting string causes the lasting margin to stretch and shape the toe section 6 and the heel section 7 but the shank sections 8 and 8' remain straight and fail to espouse the inturned curvature 9 and 9' indicated by dotted lines as the contour of the last sole.

A lip plate comprising the halves 10 and 10', hinged together at 11 for opening and closing, and provided with a closing device (not shown) with the common cam or toggle action, is placed against the shoe bottom and closed (FIG. 2). If the shoe bottom is provided with a welt 12, the lip plate enters the crease between welt and upper and forces the shank sections of the lasting margin inwardly to conform with the contour of the last sole 13. For soft leather uppers, it is sometimes indicated to obtain additional inward movement. The lip plate is then provided with shank sections 14 and 14' movable in relation to the toe and heel sections of the lip frame.

The lip frame 10 has a surface 15 for the support of the welt 12 and a cutting edge 16 for shearing action with the edge 17 of the sole cavity member 18, if trimming of the welt during sole attaching is required. Relatively little force is required for shearing which occurs consecutively over the shearing contour, compared to blanking against an anvil plate where the entire cutting occurs simultaneously. When the trimming of the welt is carried out with the common sole edge finishing, the lip plate may be provided with means, such as grooves, ridges, pins, etc. to locate the outer edge of the welt which is removed in the trimming operation. The groove 19 may serve for locating the welt having a ridge 20.

To facilitate handling, the entire lip plate is connected by means of the lever 22 and the hinge 21 to the last carrier plate 23. Posts 24 with cam locking means 25 are provided with one part of each post, of which four may be placed around the last, being fastened to the last carrier plate 23, with the other part fastened to the lip plate 10, 10'. To assure that the shearing edges 16 and 17 meet correctly, the posts 24 are extended beyond the lip plate 10 to act as guide pins 26 with corresponding holes 27 in the bottom part 18 which contains the cavity 28.

The sole cavity member 18 is commonly moved into the injection molding position onto a refrigerated table. After injection of the sole material, time has to be allowed to transfer the heat of the molten sole material to the table. The invention, providing the separation of the entire cavity forming parts from the upper before reaching the molding station, allows the prerefrigeration of both the bottom and the side walls of the sole cavity before moving the cavity part 18 into the molding position. This might be done in a deep-cooled chamber, through which the cavity part moves on the way to the molding station, or in which this part is stored until the last conveyor brings the last and upper of the size, etc. to the molding position to which the specific part 18 fits in size and width.

The separation of the lip plate from the frame forming the side walls of the sole cavity allows the procedure in two steps, i.e. first to place the lip plate against the shoe bottom of a pre-welted upper to secure its correct position on the last as a part of the lasting operation, and thereafter to place the frame forming the side walls of the sole cavity against the welt, thereby securing the correct flat position of the welt, even for high heeled footwear, without a lasting sole.

While the method and device have been described above in connection with the common injection molding of elastomeric soles, the advantages of easy inspection of correct seating of the upper on the last prior to the move to the sole attaching station exists also if the bonding of a prepared sole to the upper is to be achieved.

The combining of stringlasting on the mold last with the use of a lip plate not subjected to any essential load, allows the use of the simple and fast single loop stringlasting for toe and heel sections while the conforming of the shank sections if obtained by means of the lip plate.

What we claim is:

1. The method of manufacture of footwear which includes the steps, in sequence, of placing a prewelted upper upon a last, stringlasting said upper on the last, positioning a lip plate without a side frame in proper relation to the upper, welt and last to position and support the welt into a flat and final position for the finished footwear, locking said lip plate in said position, said last, upper and lip plate constituting a movable unit, and thereafter moving the unit in molding relation to a sole cavity member having a side frame forming the side walls thereof and placing an elastomeric material in the cavity and molding a sole to the welt.

2. The method of claim 1 further characterized in that said lip plate has movable shank sections and said shank sections are moved inwardly to further tighten the lasting string before the unit is moved in molding relation to the sole cavity.

3. The method of claim 1 further characterized in that the cavity member is refrigerated before molding.

4. The method of manufacture of footwear which includes the steps, in sequence, of placing a prewelted upper upon a last, lasting said upper on the last while positioning a lip plate without a side frame in proper relation to the upper, welt and last to position and support the welt into a flat and final position for the finished footwear, locking said lip plate in said position, said last, upper and lip plate constituting a movable unit, and thereafter moving the unit into molding relation to a sole cavity member having a side frame forming the side walls thereof and placing elastomeric material in the cavity and molding a sole to the welt.

5. The method as set forth in claim 4 comprising clamping the outer edge of said welt between said lip plate and the rim of said sole cavity member and maintaining said lip plate spaced from said cavity member while molding said sole.

6. The method as set forth in claim 5 comprising providing a temperature difference between said lip plate and said cavity member by heating said cavity member only.

7. The method as set forth in claim 4 comprising moving shank sections of said lip plate in relation to the end sections thereof towards the sole center to further tighten a lasting string before the unit is moved into the molding position.

8. The method as set forth in claim 4, wherein said cavity member is refrigerated before it is moved into the molding position.

9. The method as set forth in claim 5, wherein said cavity member is heated during the molding of the sole.

* * * * *